(12) United States Patent
Samuel et al.

(10) Patent No.: US 7,207,388 B2
(45) Date of Patent: Apr. 24, 2007

(54) NON-DAMAGING FLUID-LOSS PILL AND METHOD OF USING THE SAME

(75) Inventors: Mathew Samuel, Al-Khobar (SA); Richard Marcinew, Al-Khobar (SA); Zhijun Xiao, Kuala Lumpur (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/422,760

(22) Filed: Jun. 7, 2006

(65) Prior Publication Data

US 2006/0254771 A1    Nov. 16, 2006

Related U.S. Application Data

(62) Division of application No. 10/308,619, filed on Dec. 3, 2002, now abandoned.

(60) Provisional application No. 60/336,455, filed on Dec. 3, 2001.

(51) Int. Cl.
E21B 33/13 (2006.01)

(52) U.S. Cl. .................. 166/294; 166/305.1; 507/240; 507/244; 507/259

(58) Field of Classification Search ................ 166/282, 166/283, 294, 305.1; 175/72; 507/240, 507/244, 259, 272, 277
See application file for complete search history.

(56) References Cited

U.S. PATENT DOCUMENTS

| | | | | |
|---|---|---|---|---|
| 4,995,461 A | * | 2/1991 | Sydansk | 166/295 |
| 5,964,295 A | * | 10/1999 | Brown et al. | 166/308.2 |
| 5,979,557 A | * | 11/1999 | Card et al. | 166/300 |
| 6,159,907 A | * | 12/2000 | Van Slyke | 507/203 |
| 6,258,859 B1 | * | 7/2001 | Dahayanake et al. | 516/77 |
| 6,306,800 B1 | * | 10/2001 | Samuel et al. | 507/129 |
| 6,399,546 B1 | * | 6/2002 | Chang et al. | 507/240 |
| 6,605,570 B2 | * | 8/2003 | Miller et al. | 507/211 |
| 6,767,869 B2 | * | 7/2004 | DiLullo et al. | 507/244 |

* cited by examiner

*Primary Examiner*—George Suchfield
(74) *Attorney, Agent, or Firm*—Darla Fonseca; David Cate; Tim Curington

(57) ABSTRACT

A fluid-loss pill that includes a brine solution and an effective amount of a viscoelastic surfactant is disclosed. The viscoelastic surfactant preferably includes at least one compound selected from the family of compounds described by

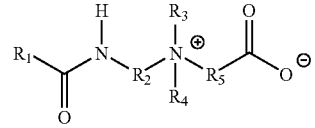

where $R_1$, $R_2$, $R_3$, $R_4$ and $R_5$ are carbon atom or carbon chains, saturated or unsaturated, single or multiple unsaturation, straight chain, branched chain or cyclic including aromatic or alicyclic groups, and $R_1$ contains 16–26 carbon atoms, $R_2$ contains 2–10 carbon atoms, $R_3$, $R_4$ and $R_5$ contains 1–6 carbon atoms. Methods of treating a well that include injecting fluid-loss pill into a well to control lost-circulation or to kill a well.

9 Claims, No Drawings

NON-DAMAGING FLUID-LOSS PILL AND METHOD OF USING THE SAME

CROSS-REFERENCE TO RELATED APPLICATIONS

This Application claims the benefit of U.S. Provisional Patent Application No. 60/336,455, filed on Dec. 3, 2001. This application is a Divisional Application of the non-provisional application filed Dec. 3, 2002 now abandoned, under Ser. No. 10/308,619.

STATEMENT OF COOPERATIVE RESEARCH AGREEMENT

The present invention, as defined by the claims herein, was made by parties to a Joint Research Agreement between Schlumberger Technology Corporation and Rhodia, Inc., as a result of activities undertaken within the scope of that Agreement relating at least to the field of the invention as described below. The Agreement was in effect prior to the date of the invention, and at the time the invention was made.

FIELD OF THE INVENTION

The invention relates generally to the exploitation of hydrocarbon-containing formations or injection wells. More specifically, the invention relates to fluid-loss control of well treatment fluids.

BACKGROUND ART

When drilling or completing wells in earth formations, various fluids typically are used in the well for a variety of reasons. The fluid often is aqueous. For the purposes herein, such fluid will be referred to as "well fluid." Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, implacing a packer fluid, abandoning the well or preparing the well for abandonment, and otherwise treating the well or the formation.

During the drilling of an hydrocarbon or injection well, the well fluid is injected into the well through a drill pipe and re-circulated to the surface in the annular area between a wellbore wall and a drill string. The well fluid properties are constantly monitored during the drilling operations and tailored to accommodate the nature of the formation stratum being encountered at the time. When drilling reaches the producing formation, special concern is exercised. Preferentially, low solids content fluids are used to minimize possible productivity loss by solids plugging pores in the formation. Proper fluid density for overbalancing formation pressure may be obtained by using high salt concentration aqueous brines, while viscosity and fluid loss control generally are attempted by polymer addition, and/or acid soluble particulates such as calcium carbonate or size salt in saturated brine solution.

Brines (such as calcium bromide, calcium chloride, zinc chloride and zinc bromide or mixtures of these) commonly are used as well fluids because of their wide density range and the fact that brines are typically substantially free of suspended solids. Additionally, brines typically do not damage certain types of downhole formations. High density brines (for instance having a density greater than 11 or even greater than 12.5 ppg) are typically used for instance when over-pressured and/or highly permeable and/or poorly consolidated formations are penetrated. The high permeability of many hydrocarbon zones allows large quantities of fluid to be lost to the formation. Dense brines are often viscosified with crosslinked polymer, but the crosslinking is not easy and predictable. When this crosslinked fluids are lost into the formation by leakoff, it is often very difficult to unload them from formations. Dense brines, e.g., calcium and zinc salts, can form highly stable, acid-insoluble compounds when reacted with some formation brines. Because of the high density of these brines, stratification tends to further inhibit the removal. Once the drilling fluid is lost into the formation, it becomes difficult to remove. Therefore, the most effective means of preventing this type of formation damage is to limit brine losses to the formation. Likewise, losses of wellbore fluids occur when heavy brines are used in other operations such as stimulation, perforation and post-fracturing treatments.

Providing effective fluid loss control is highly desirable to prevent damaging the formation in, for example, completion, drilling, drill-in, displacement, perforations, hydraulic fracturing, work-over, packer fluid placement or maintenance, well treating, or testing operations. Techniques that have been developed to control fluid loss include the use of "fluid loss pills" or "lost circulation pills." Significant research has been directed to determining suitable materials for the fluid loss pills, as well as controlling and improving the properties of the fluid loss pills. Excessive loses of high density brine into the formation have always been a major concern during completion operations, that lead to well control issues, as well as well bore damage. The problem becomes more complex when the static bottomhole temperature (BHT) exceeds 250° F., and the job involves running gravel pack assemblies and downhole sand screens.

Typically, lost-circulation pills are composed of very high concentrations of crosslinked polymers, with or without bridging particulates. Conventional fluid loss pills consist typically of a crosslinked polymer, for instance a derivative cellulose such as hydroxyethylcellulose, shredded into semi-rigid particulates. The pills may further comprise bridging particulates, usually graded sodium or potassium salts, or sized calcium carbonate particulates. The sealing mechanism in these pills is a combination of viscosity, solids bridging, and cake buildup on the porous rock. Due to the instability of polymers at high BHT, incompatibility with some divalent heavy brines, and the necessity to do remedial treatments with acid or similar, a new solids-free lost circulation pill, that is stable for prolonged periods at high BHT was developed.

Typically, fluid loss pills are used to inhibit the flow from the formation to the well bore and work by enhancing filter-cake buildup on the face of the formation to inhibit fluid flow into the formation from the well bore. However, these fluid loss pills can cause severe damage to near-wellbore areas due to polymer filtration or filter-cake formation after their application. At some point in the completion operation, the filter cake must be removed to restore the formation's permeability, preferably to its original level. If the formation permeability is not restored to its original level, production levels can be significantly reduced. Polymer-based fluid-loss control pills often require long period of clean-up. Moreover, an effective clean-up usually requires fluid circulation to provide high driving force which allows diffusion to take place to help dissolve the concentrated build up of materials and such fluid circulation may not be feasible.

Graded salt particulates can be dissolved and removed by circulating water or unsaturated salt brine. In the case of a gravel pack operation, if this occurs before gravel packing, the circulating fluid often causes sloughing of the formation into the wellbore and yet further loss of fluids to the formation. If removal is attempted after the gravel pack, the gravel packing material often traps the particles against the formation and makes removal much more difficult. Particulates such as carbonates, can be removed with circulation of acid. Acids used for this treatment is corrosive and the treatment can affect expensive screens, pumps and other down hole tools. If the filter cake with starch and Calcium carbonate is not removed, it can partially peak off (when the well is producing) and float and move randomly in the fluid and come out and get trapped in the surface equipments. On the other hand, not removing the filter cake may seriously affect the productivity (or injectivity) of the well.

Oil-soluble resins, sized calcium carbonates and graded salt particulate will remain isolated in the pores of the formation unless they are in contact with solvent. In the cases where the solid materials cover a long section of wellbore, the rapid dissolution by solvent causes localized removal. Consequently, a thief zone forms and the majority of the solvent leaks through the thief zone instead of spreading over the entire wellbore length. This will dramatically lower the effectiveness of the Cleanup.

The use of conventional gel pills made from crosslinked polymers in controlling fluid loss requires pumping the material through large-diameter tubing because of high friction pressures. These materials are typically prepared at the well site. The most commonly used fluid-loss control pills contain high concentrations (100 to 150 lbs/1000 gal) of hydroxyethylcellulose (HEC). HEC is generally accepted as a polymer affording minimal permeability damage during completion operations. Normally, HEC polymer solutions do not form rigid gels, but control fluid loss by a viscosity-regulated or filtration mechanism. Such polymer fluids may penetrate deeper into the formation than other crosslinked polymers. Permeability damage may increase with increasing penetration of such polymeric fluids.

U.S. Pat. No. 5,981,447 provides fluid loss pill comprised of a crosslinked gel of HEC by zirconium. This product requires a pH greater than 12.5. The pH increase is achieved by adding magnesium oxide, which solubility is improved by adding a chelant. By a chelating mechanism, the high-temperature stability of the crosslinked gel is improved up to 290° F. The use of high pH in a calcium, magnesium and iron environment could precipitate the corresponding hydroxides that will further reduce leakoff, but these insoluble are damaging and are difficult to remove. In a typical fluidloss pill, there may be a need to more than ten additives such as a temperature stabilizer, a delaying agent, a gelling agent, a pH adjusting agent, a crosslinker, a crosslinker activator, a chelating agent, a breaker, a breaker aid, a biocide, and fluid loss additives.

Because of the high temperature, high shear (caused by the pumping and placement), high pressures, and low pH to which well fluids are exposed ("stress conditions"), the polymeric materials used to form fluid loss pills and to viscosity the well fluids tend to degrade rather quickly. In particular, for many of the cellulose and cellulose derivatives (such as HEC) used as viscosifiers and fluid control loss agents, significant degradation occurs at temperatures above 200° F. and higher. HEC, for example, is considered sufficiently stable to be used in an environment of no more than about 225° F. Likewise, because of the high temperature, high shear, high pressures, and low pH to which well fluids are exposed, xanthan gum is considered stable to be used in an environment of no more than about 290 to 300° F., or about 320 to 330° F. in the presence of salts of formate/acetate anions. Since these formulations are short lived above 280° F., it will not provide sufficient time to do well operations after killing the well.

What is needed, therefore, are simple non-damaging polymer-free fluid loss pills that can withstand high temperature conditions.

SUMMARY OF INVENTION

In one aspect, the present invention relates to a fluid loss or lost-circulation-control pill, that includes an aqueous solution, and an effective amount of a viscoelastic surfactant, wherein the viscoelastic surfactant added in an effective amount to provide an increase of viscosity at near-static reservoir conditions. By near-static reservoir conditions it is hereby meant substantially no-shear such as for instance of about 1 sec$^{-1}$.

The aqueous solution may be fresh water or preferably a brine, in particular a heavy divalent metal brine from low to saturated solutions, preferably having a density of 11 ppg and most preferably higher than 12.5 ppg or higher.

In a preferred aspect of the invention, the viscoelastic surfactant comprises at least one compound selected from the family of compounds described by

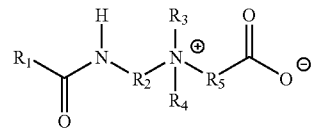

where $R_1$, $R_2$, $R_3$, $R_4$ and $R_5$ are carbon chains, saturated or unsaturated, straight, branched or cyclic including aromatic groups, and $R_1$ contains 16–26 carbon atoms, $R_2$ contains 2–10 carbon atoms, $R_3$, $R_4$ and $R_5$ contains 1–6 carbon atoms and wherein said viscoelastic surfactant is added in an effective amount to provide an increase of viscosity at near-static reservoir conditions.

In another aspect, the present invention relates to a method of treating a well that includes injecting a fluid-loss pill or lost-circulation-control pill into a well, wherein the fluid-loss pill includes a viscoelastic surfactant and a brine solution are also disclosed.

Other aspects and advantages of the invention will be apparent from the following description and the appended claims.

DETAILED DESCRIPTION

In one aspect, the present invention discloses an additive for a "fluid-loss pill" that is based on a viscoelastic surfactant, which is capable of being used in a vast range of temperatures. In one embodiment, the well fluid may be used as a fluid loss pill. Furthermore, the well fluid of the present invention is stable at high temperatures (in excess of 350° F.). In some embodiments of the invention for instance, the fluid is stable at 300° F. for extended periods >72 hours and for >36 hrs at 320° F. When used as a fluid loss pill, the well fluid is compatible with oilfield heavy brines and does not require the addition of further fluid loss materials such as starch, sized salts, carbonate chips, mica or other particulates, though this well fluid is compatible and can be used with these materials.

The base fluid may be fresh water or an aqueous solution comprising mono, di or trivalent metal salts, ammonium or mixtures of these. For some applications, in particular where freezing might be expected, the base fluid may further comprises an alcohol such as methanol, ethanol, propanol or a polyalcohol such a glycol or polyglycols or mixture thereof.

In particular embodiments, the present invention is based on adding an effective amount of a surfactant from a particular family of zwitterionic viscoelastic surfactants to a well fluid. In a preferred aspect of the invention, the viscoelastic surfactant comprises at least one compound selected from the family of compounds described by the general structure shown below:

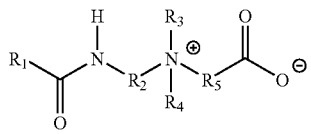

Surfactants that are suitable for embodiments of the present invention includes those in which the carbon chains $R_1$, $R_2$, $R_3$, $R_4$ and $R_5$ are carbon chains, saturated or unsaturated, straight, branched or cyclic including aromatic groups, and $R_1$ contains 16–26 carbon atoms (not counting the carbonyl carbon atom), $R_2$ contains 2–10 carbon atoms, $R_3$, $R_4$ and $R_5$ contains 1–6 carbon atoms.

In a preferred aspect of the invention, R2 and R5 are straight saturated chains and most preferably, the compounds are from the family of betaines. Two preferred examples of viscoelastic surfactants from the family of betaines are BET-O and BET-E. The surfactant in BET-O-30 is shown below. It is manufactured by Rhodia, Inc. Cranbury, N.J., U.S.A. It contains an oleyl acid amide group (including a $C_{17}H_{33}$ alkene tail group) and contains about 30% active surfactant; the remainder is substantially water, sodium chloride, and a winterizing agent.

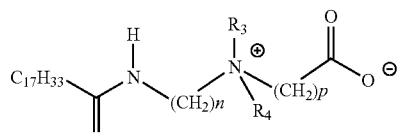

BET-O-30 (when n = 3 and p = 1

An analogous material, BET-E-40, is also available from Rhodia and contains a erucic acid amide group (including a $C_{21}H_{41}$ alkene tail group) and is about 40% active ingredient, with the remainder substantially water, sodium chloride, and isopropanol. The surfactant in BET-E-40 is also shown below. BET surfactants, and others, are described in U.S. Pat. No. 6,258,859, which is assigned to the assignee of the present invention, and is incorporated herein by reference.

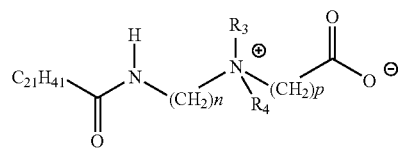

BET-E-40 (when n = 3 and p = 1)

The viscoelastic surfactant is typically added in a quantity such that the above viscoelastic surfactant blend comprises about 3% to about 30% by volume of the "fluid-loss pill" (bearing in mind that the surfactant itself is added as a solution. Therefore, to obtain a fluid comprising 10% by volume of viscoelastic surfactant blend, 10 ml of a solution of surfactant blend must be added to 100 ml of base fluid (water/brine). Preferred ratio ranges between about 5% and about 20% by volume and most preferred ratio is between 8 to 15% by volume.

According to U.S. Pat. No. 6,258,859, cosurfactants may be useful in extending the brine tolerance, and to increase the gel strength and to reduce the shear sensitivity of the VES-fluid, especially for BET-O. An example given in the above patent is sodium dodecylbenzenesulfonate (SDBS) as shown below. The ability of cosurfactants to increase the gel stability of other main surfactants depends upon the cosurfactant having the appropriate geometry (including the appropriate tail group length) and appropriate affinity for the main surfactant head group. The appropriate geometry is essentially independent of the presence of other electrolytes. Affinity for the main head group can be affected by electrolytes, their concentration and pH.

Benzene sulfonate. Preferred compounds are when R is $(CH_2)_x CH_3$ and x is from 5 to 15. SDBS is when R=C12H25 and the counter-ion X is sodium Other suitable cosurfactants for BET-O-30 are certain chelating agents such as trisodium hydroxyethylethylenediamine-triacetate.

In certain embodiments, a surfactant may also be blended with the cosurfactant. Suitable cosurfactants include the class of benzene sulfonates that shown above in which x=5–15; preferred cosurfactants are those having x=8–12. Cosurfactants are more commonly used with BET-O-30 and are generally not needed with BET-E-40, but any of the suitable betaines can be used with or without cosurfactants.

In one embodiment, erucylamidopropyl betaine is used as the surfactant. An "effective" amount as used herein means an amount of viscoelastic surfactant that is able to raise the viscosity and/or temperature stability of a well fluid to a level required by the specific application. It is believed that the combination of viscoelastic surfactant in the presence of brine can result in micelle formation and the entanglement of micelles can lead to increased viscosity for the fluid. Other applications have noted the presence of micelles in well fluids, such as those disclosed by U.S. Pat. No. 5,964,295, assigned to the assignee of the present invention.

EXPERIMENTAL DATA

A comprehensive laboratory investigation of BET-E rheological behavior under different chemical environment has been conducted to evaluate the effects of brine density, brine types, gelling agent concentration, pH, presence of alcohols, and temperature on the system rheological behavior. Additional tests were done on the retained permeability and fluid loss evaluation of solid-laden pill at the high permeability conditions.

Fluid Preparation: In a typical experiment, a solution of erucylamidopropyl betaine blend (10 v/v % solution of a 30 v/v % active erucylamidopropyl betaine) was mixed to 13 ppg $CaBr_2$ brine solution in a Warring blender. The fluid was agitated at high shear to result in the development of viscosity. The pH of the solution was measured using a standard hydrogen electrode. The rheology, fluid loss and retained permeability of the erucylamidopropyl betaine/brine solution were then investigated.

Rheological Measurement: For testing the rheological behavior, a Fann 50 or NI HTHP rheometer was used. n' and K', the Power Law parameters of the fluid were measured at several RPM and from this data, the apparent viscosity of the fluid is calculated at various shear rates. The calculated high and low shear viscosities are given. Viscosity was calculated for a low shear rate of 1 $sec^{-1}$ to mimic the shear that the fluid will experience while leaking off.

Core Flow Study: The effectiveness of the fluid to prevent leakoff was investigated by measuring the pressure gradient observed while pumping the fluid through a core. A carbonate core with known porosity and permeability is used to test the fluidloss effectiveness. Initially, the differential pressures were measured by pumping a 36% CaCl2 solution at various rates ranging from 2 to 6 cc/minute. CaCl2 solution was injected both forward and in the reverse direction. The delta P when pumping the fluidloss pill is monitored.

The same set of core flow experiment was used to investigate the non-damaging nature of the fluid. Permeability to 36% CaCl2 were measured in forward and reverse directions at several flow rates. Once the base line is established, the fluidloss control pill is pumped followed by water, hydrocarbon or mutual solvent to determine the retained permeability.

Fluidloss Study: For testing the static fluid loss and retain permeability, a cementing dynamic fluid loss cell was used. Initial permeability of a ceramic disc of 2.54 cm diameter and 1 cm thickness was evaluated prior to placement on the bottom of the cell. 100 ml fluid (or slurry) is placed on the top of the ceramic disc and the cell is assembled. The assembly is heated up to bottomhole static temperature (BHST) and a top pressure of 100 psi is applied. The top valve on the top is opened and the bottom closed. The operator applies 100 psi on bottom and slowly increases the top pressure to 105 psi to run the leak-off test. More pressure is applied on the top if 5 psi is not enough to initiate the flow. The volume of filtrate is recorded against time. The final permeability is tested after flushing the ceramic disc with ethylene glycol monobutyl ether, a mutual solvent.

The apparent viscosity of a solution containing 10% v/v of erucylamidopropyl betaine in 90% v/v 13 ppg $CaBr_2$ brine at different temperatures are summarized below. The viscosity is calculated from the Power Law parameters, n' and K'.

TABLE I

| TEMP (° F.) | VISCOSITY (cP) | | | | |
|---|---|---|---|---|---|
| | $1\ s^{-1}$ | $10\ s^{-1}$ | $40\ s^{-1}$ | $100\ s^{-1}$ | $170\ s^{-1}$ |
| 87 | 3433 | 919 | 366 | 246 | 182 |
| 104 | 3571 | 920 | 356 | 237 | 173 |
| 146 | 12825 | 2302 | 693 | 413 | 278 |
| 204 | 28947 | 4655 | 1298 | 749 | 491 |
| 249 | 15048 | 2373 | 652 | 374 | 244 |
| 277 | 18065 | 2611 | 676 | 377 | 242 |
| 302 | 1713 | 781 | 451 | 356 | 297 |
| 311 | 781 | 480 | 341 | 295 | 264 |
| 323 | 266 | 238 | 220 | 213 | 207 |
| 325 | 251 | 225 | 207 | 201 | 195 |
| 333 | 147 | 149 | 152 | 152 | 153 |
| 353 | 42 | 58 | 73 | 81 | 87 |
| 362 | 18 | 31 | 46 | 54 | 61 |
| 375 | 4 | 11 | 24 | 33 | 42 |

Table I shows that the apparent viscosity of the VES/brine mixture remained relatively stable as shear force was increased, even at temperatures approaching 375° F. Moreover, Table I shows that the above fluid loss pill provides significant viscosity enhancement without any additional additives and that such enhancement is not lost with increasing temperature. In addition, the fluid has very high low shear viscosity (1 s–1 for instance) and is thus very effective as a fluid loss control pill (viscosity based fluid loss control rather than the conventional filter cake dependent leakoff control).

In another embodiment of the present invention, a solution of erucylamidopropyl betaine (30% erucylamidopropyl betaine in a winterizing formulation containing water, salt and an antifreezing solvent) was added to a 12.5 ppg $CaBr_2$ brine solution, in an amount sufficient to constitute 15% by volume of erucylamidopropyl betaine in the resultant solution. Methanol was then added, with mixing, to the erucylamidopropyl betaine/brine solution in an amount sufficient to constitute 5% by volume of methanol in the resultant solution. The rheology of the methanol/erucylamidopropyl betaine/brine solution was investigated using the same Fann 50 viscometer as described above. In this case, the temperature of the solution was raised from 75° F. to 350° F. over a period of two and a half hours. The solution was then held at 350° F. for five hours to determine the fluid stability at 350° F. for extended periods. Viscosity measurements were made during this time. The results are summarized below in Table II.

TABLE II

| Time | Temperature | Viscosity (cp) at $s^{-1}$ | | | | |
|---|---|---|---|---|---|---|
| (Hr:min) | (° F.) | 1 | 10 | 40 | 100 | 170 |
| 0:00 | 75 | 12612 | 2021 | 671 | 324 | 212 |
| 0:05 | 100 | 19353 | 2688 | 819 | 373 | 237 |
| 1:00 | 200 | 359 | 281 | 242 | 219 | 207 |
| 1:30 | 300 | 225 | 71 | 35 | 22 | 17 |
| 2:00 | 325 | 546 | 104 | 38 | 20 | 14 |
| 2:30 | 350 | 263 | 71 | 32 | 19 | 14 |
| 3:30 | 350 | 508 | 98 | 36 | 19 | 13 |
| 4:30 | 350 | 498 | 94 | 34 | 18 | 12 |
| 5:30 | 350 | 522 | 101 | 37 | 19 | 13 |
| 6:30 | 350 | 383 | 96 | 41 | 24 | 17 |
| 7:30 | 350 | 661 | 127 | 47 | 24 | 17 |

Table II shows that this particular composition maintains sufficient viscosity at low shear rates (1 and 10 $s^{-1}$) for several hours at 350° F. (gel is not broken at 350 F even after 7 hrs. Experiment was stopped because of the safety issues of heating the fluid at 350 F for overnight. The viscosity is not lost even after heating the fluid in closed high pressure bottle at 350 F for more than 24 h.

Table III shows the effect of brine density on gel rheology. All fluids were composed of 10% BET-E-40 based on the weight of the calcium bromide brine (no methanol added). Increasing brine density improves viscosity of the fluid and gel stability at higher temperatures.

TABLE III

| Temperature | Viscosity at 1 sec−1 (cp) | | |
|---|---|---|---|
| (F.) | 11.6 ppg | 12.7 ppg | 13.6 ppg |
| 75 | 3627 | 4241 | 1628 |
| 100 | 10366 | 6262 | 4627 |
| 125 | 16474 | 11864 | 8150 |
| 150 | 26864 | 20577 | 19581 |
| 175 | 6801 | 36421 | 30563 |
| 200 | 21974 | 6353 | 10002 |
| 225 | 21171 | 27505 | 17878 |
| 250 | 1430 | 12547 | 30083 |
| 275 | 164 | 910 | 10253 |
| 300 | 42 | 87 | 740 |
| 325 | 6 | 17 | 171 |
| 350 | 2 | 2 | 74 |

Through the fluid loss control pill work at all brine concentrations, optimization of brine type (for instance CaBr2 gave better viscosity compared to the same concentration of CaCl2), and an optimum concentration of brine is necessary for the best high temperature performance of the fluid. Similarly, higher concentration of surfactant is also needed for better performance at high temperatures.

Experiments were also conducted to compare the effectiveness of the fluid made from different divalent and monovalent salts. The result is summarized in Table IV.

TABLE IV

| Temperature | Viscosity at 40 sec−1 (cp) | |
|---|---|---|
| (F.) | 12.7 ppg CaBr2 | 12.7 ppg NaBr |
| 75 | 366 | 408 |
| 100 | 356 | 791 |
| 150 | 693 | 1509 |
| 200 | 1298 | 649 |
| 250 | 652 | 403 |
| 275 | 676 | 138 |
| 300 | 451 | 27 |
| 325 | 207 | 9 |
| 335 | 152 | — |
| 350 | 73 | — |

Above table compares the apparent viscosity of the 10% fluidloss control pill in the presence of 12.7 ppg CaBr2 and 12.7 ppg NaBr. Brines made from divalent metal salts are found to give better high temperature performance.

The pH of the fluid is normally around 4.5. Depending on the source of the brine, the pH can fluctuate to some extend. Table V shows that the pH of the final system has no dramatic effect on the rheology of the pill at any temperature. The effect of pH on the apparent viscosity of 7% BET-E-40, within a pH range of 3 to 10 is shown below in Table V.

TABLE V

| Temperature | Viscosity of 7% Pill at 40 sec−1 (cP) | | |
|---|---|---|---|
| (F.) | pH 3.9 | pH 7.6 | pH 9.8 |
| 75 | 187 | 196 | 204 |
| 100 | 283 | 346 | 324 |
| 125 | 312 | 344 | 437 |
| 150 | 271 | 211 | 324 |
| 175 | 264 | 229 | 268 |
| 200 | 313 | 304 | 284 |
| 225 | 326 | 338 | 312 |
| 250 | 115 | 182 | 166 |
| 275 | 72 | 73 | 69 |
| 300 | 50 | 44 | 51 |

The recovery of the fluidloss pill viscosity was measured under conditions in which the temperature was dramatically changed under high shear conditions. 10% BET-E blend in 106 pcf CaBr2 was subjected to drastic cooling and heating cycles. The pill viscosity was measured during three heating and cooling cycles. During each cycle the pill was continuously heated to 280° F. for 30 minutes. the degradation rate of the surfactant is very low, which will allow the pill to last more than 72 hours.

In some applications, the stability of the pill at BHT for extended periods is very important for well control. Hence apparent viscosity of the fluid is measured at the BHT for 72 hours. The apparent viscosity (measured with a Fann 50) of a solution comprising 15% BET-E-40 in 5% methanol in 87 pcf CaCl2 brine at 280 F was found to be about 260 cp@170 s−1 for the entire 72 tested and the fluid is not degraded in this period. The fluid may last for several weeks at 280 F, and the experiment is discontinued because of the experimental limitations.

Core flow tests were also performed with carbonate cores having approximately 16% porosity and 450 md permeability with air. Delta Pressure was monitored by pumping a 36% CaCl2 solution at various rates ranging from 2 to 6 cc/minute. CaCl2 solution was injected both forward and in the reverse direction. When pumping the Pill, on the 2 inch core a delta P of 475 psi was observed indicating good control of the fluidloss. The core when flushed with a mutual solvent, the delta P went down to zero indicating the complete cleanup. This cleanup is observed when using even with 1% mutual solvent or with excess of water. The new fluid loss control pill is non-damaging (100% retained permeability).

Fluid loss testing was performed on the 1 cm disk with a 10% BET-E fluid in 13.5 ppg calcium bromide brine (with or without a bridging agent). The bridging agent was added at a ratio of 20 g of calcium carbonate particulates per 100 ml of gel and consisted of 80% of coarse and 20% of medium particulates designed for bridging highly permeable gravel-pack or screens. The tests were performed at 350 F, using a 5 psi pressure differential to initiate the flow (25 psi for the data marked with an asterisk). Table VI is the summary of the fluid loss testing on the different loss control systems.

TABLE VI

| | Filtrate Collected (ml) | | |
|---|---|---|---|
| Time (min) | 13.5 ppg CaBr2 brine (blank) | 13.5 ppg CaBr2 brine + 10% BET-E-40 | 13.5 ppg CaBr2 brine + 10% BET-E-40 + bridging particulates |
| 1 | 95 | 14 | 8 |
| 2 | — | 29 | 12 |
| 3 | — | 45 | 15 |
| 4 | — | 60 | 18 |
| 5 | — | 71 | 21 |
| 6 | — | 80 | 25 |
| 7 | — | 94 | 28 |
| 8 | — | — | 31 |
| 9 | — | — | 33 |
| 10 | — | — | 36 |
| 11 | — | — | 38 |
| 12 | — | — | 41 |
| 13 | — | — | 43 |
| 14 | — | — | 46 |
| 15 | — | — | 48 |
| 16 | — | — | 50 |
| 17 | — | — | 56 (*) |
| 18 | — | — | 62 (*) |
| 19 | — | — | 68 (*) |
| 20 | — | — | 72 (*) |
| 21 | — | — | 77 (*) |
| 22 | — | — | 81 (*) |
| 23 | — | — | 86 (*) |
| 24 | — | — | 91 (*) |
| 25 | — | — | 95 (*) |

The fluid loss results listed in table VI above show that the blank gel (without bridging particulates) can reduce the brine fluid loss from >95 ml/min to 14 ml/min. A gel pill further comprising bridging particulates lead to a reduction to 3–4 ml/min. To be noted that the results discussed in this section are not representing the real fluid loss behavior inside the reservoir since the effective length of porous medium to be traveled through is considerably greater than the ceramic disc used in these tests. This fluid is found very effective in fluidloss control in the field application. The test results conclusively indicates that the addition of sized particles provides better fluid loss control performance.

The initial permeability of a ceramic disc was 1824 mD. After leak-off of the gel pill consisting of a 13.5 ppg CaBr2 brine+10% BET-E-40, the permeability was 1647 mD. After flushing with a mutual solvent, the permeability was 1854 mD, resulting in retained permeability of 102%, essentially showing again that no damage on the permeable media when this pill is used.

It was further found that the addition of methanol lowers the apparent viscosity but increases the gel stability.

Several "frac and pack" completions were performed in highly-permeable sweet-gas and acid stimulations in the oil and water injection wells. Limited volume gel pills were used to prevent losses both after perforating and after hydraulic fracturing and gravel-pack operations. The pills were found effective on zones with bottomhole temperature ranging from 200° F. to 320° F. Brine loses were effectively stopped or controlled for more than 3 days. The effectiveness of the pill was demonstrated by a five-fold increase in pumping pressure during placement. The wells were flowed back at rates exceeding expectations without further remediation or stimulation.

The pills according to the invention minimize brine losses especially in high-temperature well-control applications where conventional polymer fluids are not stable. The polymer-free pill controlled losses and allowed pipe tripping in a clear, filtered brine without well control issues.

Furthermore, it should be noted that while the above examples mostly discuss the utility of viscoelastic surfactant in $CaBr_2$ containing brine solutions, it will be clear to one of ordinary skill in the art that other brine solutions, such as $ZnCl_2$, $CaCl_2$, and $ZnBr_2$, NaCl, KCl, $NH_4Cl$, $NH_4NO_3$, $MgCl_2$, seawater, NaBr, $Na_2S_2O_3$, sodium acetate, sodium formate, potassium acetate, potassium formate, and combinations thereof, may be used to form brines having a density of at least 12.5 ppg. Additionally for low pressure wells requiring fluid loss or well control, lighter weight brines, down to and including fresh water, may be utilized.

In addition, while specific amounts of the chemicals used are described in the above embodiments, it is specifically within the contemplation of the invention that amounts different from those described above may be used to provide the desired thermal stability, depending on the particular application. For example, in one embodiment, a suitable fluid loss pill may comprise 2% by volume to 30% by volume VES blend in a brine solution. More preferably, in one embodiment the fluid loss pill may comprise 5% by volume to 20% by volume viscoelastic surfactant. Still more preferably, in one embodiment the fluid loss pill may comprise 10% to 15% by volume of viscoelastic surfactant blend.

Furthermore, while the above embodiments describe viscoelastic/brine solutions for use as a fluid loss pill, the viscoelastic/brine solutions may be used for other applications such as killing a well. Another application is to use the fluid loss pill of the invention in a method of pre-conditioning a well in a high-permeable reservoir prior to performing the injection of a polymer-base fluid. The injection of a fluid loss pill according to the invention minimizes the volume of polymer invasion into the formation before the formation of the polymer-containing filter cake and consequently, the formation damage associated with the stimulation of highly permeable rock is reduced. Another possibility is to use the fluid loss pill actually as a carrier fluid for placing a gravel pack comprising specifically graded solids [calcium carbonate, mica, silica, Kolite, cellophane flake, fibers, etc] to control lost circulation in fractured/vugular formations as well. Resins and/or polymer systems (linear or crosslinked) can be mixed to provide a filter cake if needed too. One of ordinary skill in the art, having reference to this disclosure would recognize these applications without having to perform undue experimentation.

According to a further embodiment, the fluid-loss pill of the invention is used for non-damaging well control/kill operations, using the viscoelastic gel to carry graded particulate sizes (large particles such as proppant/sand solids for bridging initially across perforations or open-hole, and "capped" with smaller particulates such as calcium carbonate or silica fines). The process involves providing a graded size and specific gravity differential to ensure the finer particles settle on top of the larger particles to provide a relatively impermeable filter-cake. The viscoelastic surfactant provides the necessary carrying capacity for the solids bridge, and a non-damaging fluid-loss control. This specific mixing and placement technique is rather unique, since the gel stability can be altered to suit the temperature regime by either remaining stable, or break down to allow solids to rapidly settle and cause the particulate bridging/stratification process to occur. In other words, this technique provides a way of controlling segregation rate of graded particle sizing/specific gravities.

Embodiments of the present invention provide advantages over prior art well fluids and in particular, prior art fluid loss pills and kill fluids. Embodiments of the present invention disclose a simple system composed of only two additives; a surfactant and a brine (more additives can be added to alter or stabilize fluid properties if necessary). The fluid is compatible with all oilfield brines and do not require any adverse pH conditions to function. Furthermore, embodiments of the present invention advantageously provide a fluid that contains no polymer, solid additives or particulates, which may cause formation damage. In addition, the present invention advantageously provides viscosity controlled fluid loss rather than particulate (filter cake) controlled fluid loss, making the present invention easier to remove and non-damaging.

Furthermore, embodiments of the present invention do not show a time dependent breakdown with temperature. In addition, embodiments of the present invention operate at "mild" pH ranges (4.5 in one embodiment), increasing the number of additives that can be used, should additives be required. In addition, because of high particle suspension carrying capability of the fluid, this fluid can carry debris produced while perforating the formation, to the surface. The fluid can also be used to effectively sweep the debris, particulates, proppants, scales, beads used to remove scales, fibers, and fines. Further, because of the ability to suspend particulates, materials may be added to the fluid if additional fluid loss control is required. In particular, soluble bridging particulates, e.g., calcium carbonate or resins, may be useful. These soluble bridging particulates can be easily removed by acid or hydrocarbon solvent wash. Other non-damaging bridging agents that do not penetrate nor damage the formation matrix may be also used and easily removed either by physical circulation from the well bore (such as circulating out proppant slugs) or solvent/acid dissolution.

In addition to the above, embodiments of the present invention provide a well fluid that has long term stability (i.e., does not break/decompose within 72 hours). Advantageously, this allows a well fluid to be mixed in accordance with the above embodiments and stored for later use. Because of the constantly changing conditions in the wellbore, it is often desirable to have the flexibility to store a well fluid for a period of time, prior to the use. Furthermore, because certain embodiments of the present invention rely on a two component mixture, the formulation time for the well fluid is greatly reduced over prior art well fluids, which may incorporate as many as ten different additives. Moreover, the same formulation is applicable for applications ranging from about 50° F. to about 350° F.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of killing a well comprising injecting a fluid loss pill comprising:
   a) an aqueous solution; and
   b) a viscoelastic surfactant added in an effective amount to provide an increase of viscosity at near-static reservoir conditions;
wherein the aqueous solution is a brine having a density of at least 11 pgg.

2. The method of claim 1 wherein the viscoelastic surfactant comprises at least one compound selected from the family of compounds described by

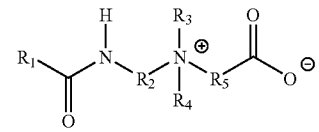

where $R_1$, $R_2$, $R_3$, $R_4$ and $R_5$ are carbon atom or carbon chains, saturated or unsaturated, single or multiple unsaturation, straight chain, branched chain or cyclic including aromatic or alicyclic groups, and $R_1$ contains 16–26 carbon atoms, $R_2$ contains 2–10 carbon atoms, $R_3$, $R_4$ and $R_5$ contains 1–6 carbon atoms.

3. The method of claim 1 wherein the aqueous solution is a brine having a density of at least 11.5 pgg.

4. The method of claim 1, wherein the viscoelastic surfactant comprises an erucylamidopropyl betaine.

5. The method of claim 1, wherein the viscoelastic surfactant an oleylamidopropyl betaine.

6. The method of claim 1, wherein the viscoelastic surfactant is used in conjunction with a polymer, linear or crosslinked to build viscosity and also to develop a filtercake.

7. The method of claim 1, wherein the viscoelastic surfactant comprises about 0.3% to about 12% by volume of the fluid loss pill.

8. The method of claim 1, wherein the pill further comprises a cosurfactant selected among the class of benzene sulfonate described by

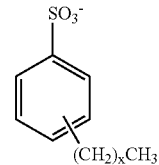

wherein x=5–15.

9. The method of claim 1, wherein the pill further comprises particulates selected among acid or chelant soluble particulates, resins, graded starches and polymers.

* * * * *